(12) United States Patent
Waldvogel et al.

(10) Patent No.: US 9,988,568 B2
(45) Date of Patent: Jun. 5, 2018

(54) USE OF ANTI-AGGLOMERANTS IN HIGH GAS TO OIL RATIO FORMATIONS

(71) Applicant: Ecolab USA Inc., Eagan, MN (US)

(72) Inventors: John Waldvogel, Metairie, LA (US); Qiwei Li, Manvel, TX (US); Peter Webber, Sugar Land, TX (US); Andrea Gutierrez, Pearland, TX (US); Pritesh Sharma, Missouri City, TX (US)

(73) Assignee: Ecolab USA Inc., St. Paul, MN (US)

( * ) Notice: Subject to any disclaimer, the term of this patent is extended or adjusted under 35 U.S.C. 154(b) by 151 days.

(21) Appl. No.: 14/610,789

(22) Filed: Jan. 30, 2015

(65) Prior Publication Data

US 2016/0222277 A1 Aug. 4, 2016

(51) Int. Cl.
*C09K 8/035* (2006.01)
*C09K 8/52* (2006.01)
*E21B 21/06* (2006.01)

(52) U.S. Cl.
CPC ............ *C09K 8/035* (2013.01); *C09K 8/52* (2013.01); *E21B 21/068* (2013.01); *C09K 2208/22* (2013.01)

(58) Field of Classification Search
CPC ...... C09K 2208/22; C09K 8/035; C09K 8/52; C09K 8/524; E21B 21/068
See application file for complete search history.

(56) References Cited

U.S. PATENT DOCUMENTS

| | | | |
|---|---|---|---|
| 4,007,787 A * | 2/1977 | Cottle | E21B 43/17 166/267 |
| 4,973,775 A | 11/1990 | Sugier et al. | |
| 5,244,878 A | 9/1993 | Sugier et al. | |
| 5,331,105 A | 7/1994 | Duncum et al. | |
| 5,426,258 A | 6/1995 | Thomas et al. | |
| 5,648,575 A | 7/1997 | Klomp et al. | |
| 5,816,280 A | 10/1998 | Rojey et al. | |
| 5,877,361 A | 3/1999 | Rojey et al. | |
| 5,879,561 A | 3/1999 | Klomp et al. | |
| 5,958,844 A | 9/1999 | Sinquin et al. | |
| 6,015,929 A | 1/2000 | Rabeony et al. | |
| 6,102,986 A | 8/2000 | Klug | |
| 6,214,091 B1 | 4/2001 | Klomp | |
| 6,331,508 B1 | 12/2001 | Pakulski | |
| 6,379,294 B1 | 4/2002 | Buijs et al. | |
| 6,436,877 B1 | 8/2002 | Duncum et al. | |
| 6,444,852 B1 | 9/2002 | Milburn et al. | |
| 7,183,240 B2 | 2/2007 | Dahlmann et al. | |
| 7,264,653 B2 | 9/2007 | Panchalingam et al. | |
| 7,323,609 B2 | 1/2008 | Dahlmann et al. | |
| 7,381,689 B2 | 6/2008 | Panchalingam et al. | |
| 7,615,102 B2 | 11/2009 | Leinweber et al. | |
| 7,989,403 B2 | 8/2011 | Acosta et al. | |
| 8,034,748 B2 | 10/2011 | Dahlmann et al. | |
| 8,134,011 B2 | 3/2012 | Rivers et al. | |
| 2002/0038063 A1 | 3/2002 | Przybylinski et al. | |
| 2004/0167040 A1 | 8/2004 | Dahlmann et al. | |
| 2008/0064611 A1 | 3/2008 | Spratt | |
| 2008/0293597 A1 | 11/2008 | Rivers | |
| 2009/0043146 A1 | 2/2009 | Leinweber et al. | |
| 2010/0222239 A1 | 9/2010 | Acosta et al. | |
| 2012/0078021 A1 | 3/2012 | Durham et al. | |
| 2012/0088942 A1 | 4/2012 | Feustel et al. | |
| 2012/0157351 A1 | 6/2012 | Webber | |
| 2012/0161070 A1 | 6/2012 | Webber et al. | |
| 2012/0190893 A1 | 7/2012 | Tian et al. | |

FOREIGN PATENT DOCUMENTS

| | | |
|---|---|---|
| EP | 0 526 929 A1 | 7/1991 |
| EP | 0 457 375 A1 | 11/1991 |
| WO | 2010/048365 A2 | 4/2010 |
| WO | 2010/101477 A1 | 9/2010 |
| WO | 2010/111226 A2 | 9/2010 |
| WO | 2014/105764 A1 | 7/2014 |

OTHER PUBLICATIONS

Sanford, E., et al., "A New Field-Proven, Cost-Effective Solution for MEG Regeneration Unit Issues in Offshore Australia Gas Production," Champion Technologies presentation presented at the Australian Petroleum Production & Exploration Association's Conference and Exhibition 2011 in Perth, Australia on Apr. 11, 2011, 18 pages.

Sanford, E., et al., "A New Field-Proven, Cost-Effective Solution for MEG Regeneration Unit Issues in Offshore Australia Gas Production," Champion Technologies paper presented at the Australian Petroleum Production & Exploration Association's Conference and Exhibition 2011 in Perth, Australia on Apr. 11, 2011, 7 pages.

International Search Report and Written Opinion dated Mar. 17, 2016 relating to PCT Application No. PCT/US2015/064890, 13 pages.

* cited by examiner

*Primary Examiner* — Francis Tischler

(74) *Attorney, Agent, or Firm* — Senniger Powers LLP

(57) ABSTRACT

The present invention generally relates to one or more compositions and methods for inhibiting the formation of gas hydrate agglomerates in a fluid. The fluid may be contained, for example, in an oil or gas pipeline or refinery.

18 Claims, No Drawings

USE OF ANTI-AGGLOMERANTS IN HIGH GAS TO OIL RATIO FORMATIONS

FIELD OF THE INVENTION

The present invention generally relates to one or more compositions and methods for inhibiting the formation of gas hydrate agglomerates in a fluid. The fluid may be contained, for example, in an oil or gas pipeline or refinery.

BACKGROUND OF THE INVENTION

Natural gas hydrates are crystalline solids composed of water and gas. In these solids, the gas molecules (guests) are trapped in water cavities (host) that are composed of hydrogen-bonded water molecules. Methane is the main gas in naturally occurring gas hydrates, however carbon dioxide, hydrogen sulfide, and less frequently, other hydrocarbons such as ethane and propane can be found within the hydrate structure. In 1934, Hammerschmidt determined that natural gas hydrates were blocking gas transmission lines, frequently at temperatures above the ice point. This discovery caused a more pragmatic interest in gas hydrates and led to the regulation of the water content in natural gas pipelines.

Gas hydrates can be easily formed during the transportation of oil and gas in pipelines under certain conditions. Factors affecting gas hydrate formation include gas composition, water content, temperature and pressure, particularly low temperature and high pressure. While these crystalline cage-like structures are small initially, they are able to agglomerate into solid masses called gas hydrate plugs. The formation of gas hydrates within a pipeline often results in lost oil or gas production, damage to transmission lines and equipment, and safety hazards to field workers.

Three types of hydrate inhibitors are currently available to the energy industry for controlling gas hydrates: thermodynamic hydrate inhibitors (THIs), kinetic hydrate inhibitors (KHIs), and anti-agglomerants (AAs). Thermodynamic inhibitors are substances that can reduce the temperature at which gas hydrates form at a given pressure and water content. Methanol and ethylene glycol are among the most common thermodynamic inhibitors used in the oil industry. However, thermodynamic inhibitors often have to be added in large amounts to be effective, typically in the order of several tens of percent by weight of the water present. Therefore, there is a substantial cost associated with transportation and storage of large quantities of THIs.

A more cost-effective alternative is the use of kinetic hydrate inhibitors and anti-agglomerants, which are known collectively as low-dosage hydrate inhibitors (LDHIs), reflecting the much lower dosage requirements compared with THIs. Typically, KHIs are low molecular weight polymers that adsorb on gas hydrate crystal faces and interfere with the nucleation and growth of gas hydrate crystals. Unfortunately, there are several limitations that have been discovered with the use of KHIs such as subcooling limits, solubility problems based on temperature and salt content of the water, chemical incompatibility with the system being treated, and expense of the polymers used.

Anti-agglomerants are an alternative to THIs and KHIs. Anti-agglomerants are surface active molecules that attach to and disperse fine gas hydrate crystals, preventing their agglomeration and growth into masses that could become plugs. When small gas hydrate crystals begin to form, AAs attach to them to make the surface hydrophobic, which mediates the capillary attraction between the crystals and water and disperses the crystals into the hydrocarbon phase. This results in a transportable slurry that can flow to the processing facility.

AAs are a cost effective alternative to THIs and are not generally sensitive to changes in system subcooling like KHIs. However, since AAs require a hydrocarbon phase to disperse the gas hydrate crystals, they typically have a water-cut limitation. In general, the water-cut should be below 50% because otherwise the slurry becomes too viscous to transport.

Accordingly, there is an ongoing need for compositions and methods that effectively prevent agglomeration of gas hydrates in oil and gas transportation and handling processes, particularly at water-cuts greater than 50%.

SUMMARY OF THE INVENTION

One aspect of the invention is a method for inhibiting gas hydrate agglomeration in a produced fluid. The produced fluid comprises a produced hydrocarbon and produced water. The method comprises adding an effective amount of an anti-agglomerant compound and a process liquid hydrocarbon to the produced fluid to inhibit gas hydrate agglomeration.

Another aspect of the invention is an anti-agglomeration composition for inhibiting gas hydrate formation in a hydrocarbon fluid. The composition comprises an effective amount of an anti-agglomerant compound; either a refined liquid hydrocarbon or a recycled and conditioned produced hydrocarbon; and optionally, at least one of a corrosion inhibitor, a scale inhibitor, a paraffin inhibitor, an asphaltene inhibitor, an emulsion breaker, a water clarifier, or a combination thereof.

DETAILED DESCRIPTION OF THE INVENTION

For produced hydrocarbons having a high gas to oil ratio, the low concentration of condensate and high concentration of water in the produced hydrocarbon makes it very challenging to use an anti-agglomerant to inhibit gas hydrate agglomeration and thus, prevent plugging of the equipment. In order to expand the application of anti-agglomerant chemistries to these low condensate and high water cut oil and gas fields, a method for inhibiting gas hydrate agglomeration has been developed that includes adding a refined hydrocarbon or a recycled and conditioned produced hydrocarbon to the field with an anti-agglomerate to increase the condensate concentration and thereby decrease the water cut. This method provides a way to prevent agglomeration of gas hydrates and accordingly to prevent the plugging of the equipment used for the extraction of the hydrocarbons.

To increase the proportion of condensate (e.g., liquid hydrocarbon) and decrease the water cut in the well system, a refined liquid hydrocarbon can be added until a sufficient amount of produced condensate (e.g., liquid hydrocarbon) can be recycled from the produced fluid of the well, conditioned, and mixed with the refined hydrocarbon. As the total amount of produced condensate increases, the produced and conditioned condensate would subsequently replace the refined hydrocarbon to maintain the water cut at the appropriate level for treating the system with an anti-agglomerant to inhibit gas hydrate agglomeration.

For example, the method for inhibiting gas hydrate agglomeration in a produced fluid can comprise adding an effective amount of an anti-agglomerant compound and a process liquid hydrocarbon to the produced fluid to inhibit gas hydrate agglomeration. The produced fluid can comprise a produced hydrocarbon and produced water.

Additionally, the invention can be directed to an anti-agglomeration composition for inhibiting gas hydrate formation in a hydrocarbon fluid. The composition can comprise an effective amount of an anti-agglomerant compound; either a refined liquid hydrocarbon or a recycled and conditioned produced hydrocarbon; and optionally, at least one of a corrosion inhibitor, a scale inhibitor, a paraffin inhibitor, an asphaltene inhibitor, an emulsion breaker, a water clarifier, or a combination thereof.

The produced fluid can be produced from a subsea reservoir.

The produced hydrocarbon can comprise a hydrocarbon gas, a hydrocarbon liquid, or a combination thereof.

The produced hydrocarbon can comprises a low-boiling, $C_1$-$C_5$ hydrocarbon gas.

The produced hydrocarbon can comprise methane, ethane, propane, n-butane, isobutane, isopentane, or a mixture thereof.

The process liquid hydrocarbon can comprise a refined hydrocarbon, a recycled and conditioned produced hydrocarbon, or a combination thereof.

The refined hydrocarbon can comprise fuel oil, diesel, kerosene, gasoline, or a combination thereof. Preferably, the refined hydrocarbon comprises diesel, kerosene, or a combination thereof. More preferably, the refined hydrocarbon comprises diesel.

The recycled and conditioned produced hydrocarbon can be conditioned by removing components forming a solid at about 38° F. (3° C.).

The recycled and conditioned produced hydrocarbon can be produced from a subsea reservoir, conditioned, and recycled to the produced fluid for use in the instant method.

An effective amount of the anti-agglomerant compound can be from about 0.1 vol % to about 10 vol % based on the volume of produced water in the produced fluid. Preferably, the effective amount of the anti-agglomerant compound is from about 0.1 vol % to about 5 vol %. More preferably, the effective amount of the anti-agglomerant compound is from about 0.1 vol % to about 3 vol %.

The refined hydrocarbon can be added to the produced fluid in an amount to provide a water cut of about 70%, 65%, 60%, 55%, 50%, 45%, 40%, 35%, 30%, 25%, 20%, or less. Preferably, the refined hydrocarbon can be added to the produced fluid in an amount to provide a water cut of about 50%, 45%, 40%, or less.

The anti-agglomerant can be an oxazolidinium compound (U.S. Pat. No. 8,134,011); a quaternary ammonium compound with alkyl groups, alkoxylated alkyl groups, and fatty ester groups (U.S. Pat. No. 8,034,748); an ester, such as tetrapropylene succinic acid-N,N-dibutylamino-N-ethyl ester (U.S. Pat. No. 7,615,102); a quaternary ammonium compound with alkyl groups having alkoxy, amide, and ester substitution (U.S. Pat. No. 7,323,609); a quaternary alkyl ammonium compounds (US 2004/167040); a quaternary ammonium, a quaternary phosphonium, a betaine, an amide, an amino alcohol, an ester, a sulphonium salt, or an amine oxide (U.S. Pat. No. 7,264,653); an onium compound and amine salt (US 2002/0038063); an amine compound having ether linkages (U.S. Pat. No. 6,444,852); an alkoxylated diamine (U.S. Pat. No. 6,331,508); an amine oxide and amine oxide salt (U.S. Pat. No. 6,102,986); a zwitterionic quaternary ammonium compound (U.S. Pat. No. 6,015,929); an ammonium or phosphonium alkylated hydrate (U.S. Pat. No. 5,879,561); an alkylated ammonium, phosphonium, or sulphonium compound (U.S. Pat. No. 5,648,575); a water-soluble alkoxide-based polymer or copolymer (U.S. Pat. No. 5,426,258); an amino acid (U.S. Pat. No. 5,331,105); a nonionic or anionic amphiphilic compound containing a polyol and a substituted or unsubstituted carboxylic acid (U.S. Pat. No. 5,244,878); a nonionic amphiphilic compound, especially a hydroxycarbylamide (U.S. Pat. No. 4,973,775); an organic amine and organic acid salt (US 2012/078021); a piperazine derivative (US 2010222239); a quaternary ammonium substituted with alkoxy group (US 2008/293597); an ion-pair amphiphilic complex (US 2008/064611); a rhamnolipid biosurfactant (WO 2010/111226); a citric acid ester or citramide derivative (WO 2010/101477); a quaternary amine having an amide group (US 2012/161070); a quaternary amine having an ester group (US 2012/157351); an ester quaternary ammonium compound (U.S. Pat. No. 6,379,294); a reaction product of a polymerized unsaturated oil and an amino alcohol (U.S. Pat. No. 5,958,844); an alkyl quaternary ammonium or phosphonium having alkoxylation (U.S. Pat. No. 6,214,091); a quaternary sulphonium, phosphonium, ammonium salt combined with a corrosion inhibitor (U.S. Pat. No. 6,436,877); an alkyl glycoside (EP 0526929); an alkyl aryl sulphonic acid or an alkali metal or ammonium salt (EP 0457375); a pyroglutamic acid ester (US 2012/088942 and US 2009/043146); a tertiary amine salt (US 2012/190893); a quaternary ammonium polyoxyalkylene ester (U.S. Pat. No. 7,183,240 and U.S. Pat. No. 8,034,748); a reaction product of a non-halide-containing inorganic acid, organic acid, and organic amine (WO 2010/3048365).

There are a number of factors that must be taken into account in determining the effective amount of the anti-agglomerant compound, including, but not necessarily limited to, the proportion of water in the fluid, the nature of the hydrocarbon, the nature of the hydrate-forming guest molecules, the temperature and pressure conditions that the mixture of hydrocarbon and water are subject to, the particular compound employed, etc. Routine experimentation with a particular set of conditions and/or in a specific system can determine the optimum dosage range to avoid the formation of problematic quantities of irreversible, harmful gas hydrate masses.

The methods of the present invention involve contacting a hydrocarbon and water mixture with a suitable anti-agglomerant compound. When an effective amount of the anti-agglomerant compound is used, gas hydrate blockage is inhibited. In the absence of such an effective amount, gas hydrate blockage is not inhibited.

The contacting may be achieved in a number of ways, including mixing, blending with mechanical mixing equipment or devices, stationary mixing setup or equipment, magnetic mixing or other suitable methods, other equipment and means known to one skilled in the art and combinations thereof to provide adequate contact and/or dispersion of the anti-agglomerant into the mixture. The contacting can be made in-line and/or offline. The various components of the composition may be mixed prior to and/or during contact. If needed or desired, the composition or some of its components may be optionally removed or separated mechanically, chemically, or by other methods known to one skilled in the art, or by a combination of these methods after the gas hydrate formation conditions are no longer present.

When considering the appropriate dose or whether additional doses of anti-agglomerant are needed, the temperature, pressure, brine composition, brine volume, oil composition, oil volume, and gas composition are considered for a particular system to determine the effective amount of anti-agglomerant to inhibit gas hydrate agglomeration under the conditions present for the particular system to be treated.

The anti-agglomerant is added into the mixture of hydrocarbons and water at any concentration effective to inhibit the formation of gas hydrate agglomerates under the given conditions. Accordingly, the effective amount of the compound can range from about 0.1 volume percent to about 10 volume percent based on the amount of produced water in the well system. Preferably, the effective amount of the compound can range from about 0.1 volume percent to about 5 volume percent. The effective amount of the compound can also range from about 0.5 volume percent to about 5 volume percent. Typically, the amount of produced water is based on the amount of produced water per day that is calculated from the average volume of production per day for a particular well. The effective amount of the anti-agglomerant compound can be provided to the system in one or more doses.

The anti-agglomerant or composition (e.g., anti-agglomerant and solvent) can also have particular properties for advantageous use in a well, transport, or other system. For example, the composition can have a viscosity of less than 250 cP, preferably, less than 100 cP, to provide a composition that can be easily pumped throughout a system. The anti-agglomerant can preferably have a viscosity of less than 50 cP as a neat liquid.

The compositions and anti-agglomerant are chemically compatible with various elastomers and metals. Elastomers screened or compatibility can include Neoprene (i.e., polychloroprene), Hypalon® (chlorosulfonated polyethylene synthetic rubber), nitrile butadiene rubber (NBR), ethylene propylene rubber (EPR), Teflon® (polytetrafluoroethylene), Kalrez® (perfluoro hydrocarbon elastomer), high density polyethylene (HDPE), Nylon 11 (polyamide bioplastic), polyether ether keton (PEEK), ethylene propylene diene rubber (EPDM White), hydrogenated nitrile butadiene rubber (HNBR), Viton® A (perfluoro hydrocarbon elastomer), Viton® B (perfluoro hydrocarbon elastomer), and Chemraz® (perfluoro hydrocarbon elastomer). Metals screened for compatibility can include AISI 1018 carbon steel, Inconel® 625 nickel-chromium alloy, SS2507 stainless steel, copper, SS2205 stainless steel, Hastelloy C-276® (nickel-molybdenum-chromium alloy), SS304L stainless steel, and SS316L stainless steel. The elastomers and metals are screened for compatibility at the effective amount used in the system as described above. The compositions and compounds are chemically compatible with metals when they do not cause corrosion to occur to the stainless steel and mild carbon steel components of the system and are chemically compatible with elastomers when they do not cause mass change or swelling.

Also, the compositions and compounds preferably do not interfere or react with any corrosion inhibitor, scale inhibitor, or other production chemical additives that are used in the system.

Advantageously, the anti-agglomerant do not form emulsions or foams when stored or upon use in a system. Emulsion formation can cause water quality issues in disposal of the produced water and foaming of the produced liquid can cause handling and system upset problems.

The anti-agglomerant can also reduce friction or drag when fluids are transported. Thus, these compounds and compositions can act as drag reducers or friction reducers when added to the hydrocarbon fluids.

The methods are useful for inhibiting hydrate formation for many hydrocarbons and hydrocarbon mixtures. The methods are particularly useful for lighter or low-boiling, $C_1$-$C_5$ hydrocarbon gases or gas mixtures at ambient conditions. Non-limiting example of such gases include methane, ethane, propane, n-butane, isobutane, isopentane and mixtures thereof. Other examples include various natural gas mixtures that are present in many gas and/or oil formations and natural gas liquids. The hydrates of all these low-boiling hydrocarbons are also referred to as gas hydrates. The hydrocarbons may also comprise other compounds including, but not limited to, carbon dioxide, hydrogen sulfide, and other compounds commonly found in gas/oil formations or processing plants, either naturally occurring and/or used in recovering/processing hydrocarbons from the formation, and mixtures thereof.

The methods can be used at any pressure that allows formation of hydrocarbon gas hydrates. When the hydrocarbons in the mixture are lower boiling hydrocarbons or hydrocarbon gases at ambient conditions, the pressure is usually at or greater than atmospheric pressure (i.e. about 101 kPa), preferably greater than about 1 MPa, and more preferably greater than about 5 MPa. The pressure in certain formation or processing units or plants could be much higher, such as greater than about 20 MPa. There is no specific high-pressure limit.

The temperature for contacting the mixture with the compound or composition is usually approximately at or below ambient or room temperature. Lower temperatures tend to favor gas hydrate formation. At much higher temperatures, gas hydrates are less likely to form.

In addition to the anti-agglomerant, the composition may also include liquids. These liquids are generally solvents for the solid form of the anti-agglomerant. Representative polar solvents suitable for formulation with the composition include water, brine, seawater, alcohols (including straight chain or branched aliphatic alcohols such as methanol, ethanol, 2-ethoxyethanol, propanol, isopropanol, butanol, isobutanol, hexanol, 2-ethylhexanol, octanol, or decanol), glycols and glycol ether derivatives (e.g. ethylene glycol, 1,2-propylene glycol, 1,3-propylene glycol, hexylene glycol, ethylene glycol monobutyl ether, ethylene glycol dibutyl ether, or diethylene glycol monomethyl ether), ethers (e.g., tetrahydrofuran), ketones (e.g. methyl ethyl ketone, cyclohexanone, or diisobutyl ketone), amides (e.g., N-methyl-2-pyrrolidinone or N,N-dimethylformamide), and combinations thereof.

Representative nonpolar solvents suitable for formulation with the composition include aliphatic hydrocarbons such as pentane, hexane, cyclohexane, methylcyclohexane, heptane, decane, dodecane, or diesel; aromatic hydrocarbons such as toluene, xylene, heavy aromatic naphtha, fatty acids or derivatives thereof (e.g., amides, esters, or a combination of amide and ester derivatives), and combinations thereof.

The selection of a suitable solvent or combination of solvents provides a stable solution of the compounds during storage and stability and reduced viscosity for the composition when injected against a pressure of 1.3 MPa to 172 MPa. The solvent is present in the composition in the range from about 1 to about 99 wt. %, preferably from about 10 to about 99 wt. %, and more preferably from about 20 to about 99 wt. % of the total composition based on the weight of the total composition.

The compositions can include other means of gas hydrate inhibition, such as thermodynamic hydrate inhibitors and kinetic hydrate inhibitors. If mixtures of gas hydrate inhibitors are used, the mixture can be added to the hydrocarbon and water mixture through a single port or multiple ports. Alternatively, individual gas hydrate inhibitors can be added to separate ports to access the hydrocarbon mixture.

The composition can include other oil field flow assurance components including, but not limited to, a corrosion inhibitor, a scale inhibitor, a paraffin inhibitor, an asphaltene inhibitor, an emulsion breaker, a water clarifier, or a combination thereof.

The particular formulation of the composition depends upon the application of the composition and any additional treatments that will be used in conjunction with the anti-agglomerant. For example, if the composition will be injected with a paraffin inhibitor that is typically only formulated in nonpolar solvents, then solvents such as diesel, heavy aromatic naphtha, fatty acid methyl esters, xylene, or toluene, may be used. The composition can also be formulated in a nonpolar solvent to minimize the risk of incompatibility between the anti-agglomerant and the other oil field flow assurance components.

Alternatively, if the composition will be injected with a water soluble corrosion inhibitor or scale inhibitor, a polar solvent such as methanol, ethanol, isopropanol, 2-butoxy-ethanol, ethylene glycol, propylene glycol, or a combination thereof, can be used.

The methods can further comprise treating the fluid with one or more gas hydrate inhibitors in addition to the anti-agglomerant. A thermodynamic hydrate inhibitor and/or kinetic hydrate inhibitor can be formulated with the AA composition or added to the fluid separately. Individual inhibitors can also be added to the fluid at separate ports. The effective amount of thermodynamic hydrate inhibitor and/or kinetic hydrate inhibitor can be empirically determined based on the characteristics of the fluid being treated, for example, using the rocking cell test described herein.

To ensure effective inhibition of agglomeration of gas hydrates, the anti-agglomerant should be injected prior to formation of gas hydrate agglomerates. The composition can be injected at the wellhead, at subsea, in a riser, or a flow line. Typically, the anti-agglomerant is injected at the wellhead or below the wellhead. The treatment can also be used for pipelines or anywhere in the system where there is a potential for gas hydrate formation.

The composition is introduced into the fluid by any means suitable for ensuring dispersal of the anti-agglomerant through the fluid being treated. Typically the anti-agglomerant is injected using mechanical equipment such as chemical injection pumps, piping tees, injection fittings, and the like. The anti-agglomerant can be injected as prepared or formulated in an additional polar or nonpolar solvent as described herein depending on the application and requirements. The anti-agglomerant can be pumped into the oil/gas pipeline by using an umbilical line. Also, capillary injection systems can be used to deliver the anti-agglomerant. U.S. Pat. No. 7,311,144 provides a description of an apparatus and methods relating to capillary injection, which is herein incorporated by reference.

The term "produced fluid" as used herein is the fluid mixture of oil, gas and water in formation fluid that flows to the surface of an oil well from a reservoir.

The term "produced hydrocarbon" as used herein is the hydrocarbon portion of the produced fluid.

The term "produced water" as used herein is the water portion of the produced fluid.

The term "process liquid hydrocarbon" as used herein is a liquid hydrocarbon

The term "refined hydrocarbon" as used herein is a hydrocarbon that has undergone a refining process to separate lighter components of the oil from the heavier components of the oil The term "recycled and conditioned produced hydrocarbon" as used herein is a produced hydrocarbon that has been conditioned to remove solid components that precipitate at a temperature of less than about 3° C. (38° F.) and is then recycled and added to the well with the anti-agglomerant compound.

The term "hydrocarbon" as used herein describes a compound or substituent consisting exclusively of the elements carbon and hydrogen.

"Inhibiting" includes both inhibiting and preventing the formation and agglomeration of hydrate crystals.

Unless otherwise indicated herein, "AA" means anti-agglomerant; "IPA" means isopropanol (isopropyl alcohol); "KHI" means kinetic hydrate inhibitor; "LDHI" means low-dosage hydrate inhibitor; "MeOH" means methanol; "NaCl" means sodium chloride; "PE" means pentaerythritol; and "THI" means thermodynamic hydrate inhibitor.

Having described the invention in detail, it will be apparent that modifications and variations are possible without departing from the scope of the invention defined in the appended claims.

EXAMPLES

The following non-limiting examples are provided to further illustrate the present invention.

Example 1: Rocking Cell Test

A Sapphire Rocking Cell RCS is commercially available from PSL Systemtechnik in Germany. The Sapphire Rocking Cell is a laboratory instrument used to test the performance of low dosage hydrate inhibitors. The compounds were evaluated based on their ability to effectively minimize the size of gas hydrate agglomerate particles and disperse those particles into the hydrocarbon phase. Chemical performance was evaluated by determining the maximum treatable water cut (water to oil ratio) and the minimum chemical dosage to register a pass in the rocking cell test.

A rocking cell has two parts, a manifold and a cell body. The manifold is made up of stainless steel fittings that are welded together. It has three stems. An inlet stem is used to charge gas into the cell. An outlet stem is used to release the gas out of the cell. The third stem connects to a transducer, which measures the pressure inside of the cell. The cell body has three layers. The outer layer is a polycarbonate tube, which has a thickness of 0.7 cm. The middle layer is made of stainless steel metal and is connected to the manifold. The inner layer is a high-pressure sapphire tube, which has an outer diameter of 2.8 cm, inner diameter of 1.85 cm, and length of 5 cm. This sapphire tube can handle up to 3000 psi. A stainless steel ball which has a diameter of 1.6 cm is located inside the sapphire tube to induce turbulence and mix fluids during the rocking process.

Test fluids usually contain three components. For the tests, water cuts between 20% and 50% were used with a natural gas condensate and/or kerosene, 0.5 wt. % sodium chloride brine, and West Delta Deep Marine (WWDM) Type I synthetic gas and various anti-agglomerate compounds. The dosage of the test compound was based on the volume of aqueous phase. The initial temperature was set to 21° C. Observations were made every two to three hours, before the rocking was stopped, and also immediately after the restart. Test compounds EC6860A, EC6798A, and HI-216 are available from Nalco Champion, Sugar Land, Tex.

Each cell was charged with WWDM Type I gas and pressurized up to 2500 psi. All cells rocked for at least 1.5 to 2 hours until fluid was saturated and pressure stabilized. The rocking was ceased and the tank temperature was reduced to the set point of 4° C. over approximately 4 hours and rocked at 4° C. for an additional 6 hours. The cells were then shut-in in a horizontal position and remained static for 24 hours. Rocking was restarted for 2 hours with frequent observations to rank each cell with a ranked set of pass/fail criterion. Pressure and tank temperature data was recorded during this time.

| Entry | Water Cut | LDHI | Vol % LDHI | Result | Rank |
|---|---|---|---|---|---|
| 1 | 20% | EC6860A | 0.25% | F | 1 |
| 2 | 20% | EC6798A | 0.5% | F | 1 |
| 3 | 20% | EC6860A | 0.5% | P, P | 4−, 3+ |
| 4 | 20% | HI-216 | 0.5% | P | 3+ |
| 5 | 20% | EC6860A | 0.75% | P, P | 4−, 4− |
| 1 | 30% | EC6798A | 0.25% | F | 1 |
| 2 | 30% | EC6860A | 0.25% | F | 1 |
| 3 | 30% | HI-216 | 0.25% | F | 1 |
| 4 | 30% | EC6798A | 0.5% | F | 1 |
| 5 | 30% | EC6860A | 0.5% | P, P | 4−, 4− |
| 6 | 30% | HI-216 | 0.5% | F | 1 |
| 7 | 30% | EC6798A | 0.75% | P, F | 4−, 1 |
| 8 | 30% | EC6860A | 0.75% | P, P | 4−, 4− |
| 9 | 30% | HI-216 | 0.75% | P, P | 4−, 4− |
| 1 | 40% | — | — | F | 1 |
| 2 | 40% | EC6798A | 0.25% | F | 1 |
| 3 | 40% | EC6860A | 0.25% | F | 1 |
| 4 | 40% | HI-216 | 0.25% | F | 1 |
| 5 | 40% | EC6798A | 0.5% | F, F, F | 1, 1, 1 |
| 6 | 40% | EC6860A | 0.5% | B, P | 3−, 4− |
| 7 | 40% | HI-216 | 0.5% | F | 1 |
| 8 | 40% | EC6798A | 0.75% | P, P | 4−, 3+ |
| 9 | 40% | EC6860A | 0.75% | P, P | 4−, 4− |
| 10 | 40% | HI-216 | 0.75% | P, P | 4−, 4− |
| 11 | 40% | EC6798A | 1% | P, P, P | 4−, 4−, 4− |
| 12 | 40% | EC6860A | 1% | P | 4− |
| 13 | 40% | HI-216 | 1% | P | 4− |
| 14 | 40% | EC6798A | 2% | P, P | 4−, 4− |
| 15 | 40% | EC6798A | 3% | P, P | 4−, 4− |
| 16 | 40% | EC6798A | 4% | P, P | 4−, 4− |
| 1 | 50% | EC6860A | 0.5% | F, F | 2, 2 |
| 2 | 50% | EC6860A | 1% | F, F | 2, 2 |
| 3 | 50% | EC6860A | 1.5% | P, P | 3+, 3+ |
| 4 | 50% | EC6798A | 2% | F, F | 1, 1 |
| 5 | 50% | EC6860A | 2% | P, P, P | 3+, 3+, 3+ |
| 6 | 50% | EC6860A | 2.5% | P, P, P | 3+, 3+, 3+ |
| 7 | 50% | EC6798A | 3% | F, F | 2, 2 |
| 8 | 50% | EC6860A | 3% | P, P | 3+, 3+ |
| 9 | 50% | EC6798A | 3.5% | F, F | 2+, 2+ |
| 10 | 50% | EC6860A | 3.5% | P, P | 3+, 3+ |
| 11 | 50% | EC6798A | 4% | P, P, P | 3+, 3+, 3+ |
| 12 | 50% | EC6860A | 4% | P, P | 3+, 3+ |
| 13 | 50% | EC6798A | 5% | P, P | 3+, 3+ |
| 1 | 60% | EC6798A | 3% | F | 2 |
| 2 | 60% | EC6798A | 4% | P, F, F | 3+, 2, 2 |
| 3 | 60% | EC6860A | 5% | F, F | 2+, 2+ |
| 4 | 60% | EC6798A | 5% | F, F | 2, 2 |
| 5 | 60% | EC6860A | 6% | F, F | 2+, 2+ |
| 6 | 60% | EC6798A | 6% | P, B | 3+, 3− |
| 7 | 60% | EC6860A | 7% | P, P | 3+, 3+ |
| 8 | 60% | EC6798A | 7% | P, P | 3+, 3+ |
| 1 | 40% | — | — | F | 1 |
| 2 | 40% | EC6798A | 1% | P | 4− |
| 3 | 50% | — | — | F | 1 |
| 4 | 50% | EC6798A | 1% | P | 4− |
| 5 | 50% | EC6798A | 2% | P, P | 4−, 4− |
| 6 | 50% | EC6798A | 3% | P, P | 4−, 4− |
| 7 | 60% | EC6798A | 2% | F | 2+ |
| 8 | 60% | EC6798A | 3% | P, P | 3+, 3+ |
| 9 | 60% | EC6798A | 4% | P, P | 3+, 4− |
| 1 | 50 | EC6798A | 0.5% | B | 3− |
| 2 | 50 | EC6798A | 1% | P | 4− |
| 3 | 50 | EC6798A | 2% | P | 4− |
| 4 | 50 | EC6798A | 3% | P | 4− |
| 5 | 60 | EC6798A | 1% | F | 1 |
| 6 | 60 | EC6798A | 2% | B | 3− |
| 7 | 60 | EC6798A | 3% | P | 3+ |
| 8 | 60 | EC6798A | 4% | P | 3+ |
| 9 | 60 | EC6798A | 5% | P | 3+ |
| 10 | 60 | EC6798A | 6% | P | 4− |

The pass/fail criteria are based on the ability of the ball in the rocking cell to move within the sapphire tube. For example, the anti-agglomerant passes the rocking cell test if at the time of the ranking, the ball moves freely when the cell is rocked indicating that few agglomerates have formed. In contrast, the anti-agglomerant fails if the ball's movement is obstructed or completely stopped by the formation of gas hydrate agglomerates. The anti-agglomerant's performance is borderline when there are observable gas hydrate agglomerates and at least some of the agglomerates are stuck to the walls of the sapphire tube; when these agglomerates are present and the movement of the ball is not restricted, the anti-agglomerant ranking is a borderline pass. WDDM synthetic gas is a standard gas composition and has the composition described in the following table.

| Component | Mole % |
|---|---|
| Nitrogen | 0.06 |
| Carbon Dioxide | 0.21 |
| Methane | 99.22 |
| Ethane | 0.36 |
| Propane | 0.11 |
| iso-Butane | 0.01 |
| n-Butane | 0.02 |
| iso-Pentane | 0 |
| n-Pentane | 0 |
| Hexane | 0.01 |

Example 2: Rocking Cell Test

The test protocol described in Example 1 was used with the modification that the shut-in angle was 25 degrees instead of horizontal. The following results were observed.

| Entry | Water Cut | LDHI | Vol % LDHI | Result | Rank |
|---|---|---|---|---|---|
| 1 | 20 | HI-216 | 0.25 | F, P | 1, 4− |
| 2 | 20 | HI-216 | 0.5 | P, P | 4−, 3+ |
| 3 | 20 | EC6798A | 0.5 | F, P | 1, 4− |
| 4 | 20 | HI-216 | 0.75 | P, P | 4−, 4− |
| 5 | 20 | EC6798A | 0.75 | F, P | 1, 4− |
| 6 | 20 | EC6798A | 1 | F, P | 1, 4− |
| 7 | 20 | EC6798A | 1.25 | P, P | 4−, 4− |
| 1 | 40 | HI-216 | 0.25 | F | 1 |
| 2 | 40 | HI-216 | 0.5 | F, P | 2, 3+ |
| 3 | 40 | EC6798A | 0.5 | F | 1 |
| 4 | 40 | HI-216 | 0.75 | P, P | 4−, 4− |
| 5 | 40 | EC6798A | 0.75 | P, P | 4−, 4− |
| 6 | 40 | EC6798A | 1 | P, P | 4−, 4− |

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above compositions and processes without departing from the scope of the invention, it is intended that all matter contained in the above description and shown in the accompanying drawing[s] shall be interpreted as illustrative and not in a limiting sense.

What is claimed is:

1. A method for inhibiting gas hydrate agglomeration in a produced fluid, the produced fluid comprising a produced hydrocarbon and produced water, the method comprising adding an effective amount of an anti-agglomerant compound and a process liquid hydrocarbon to the produced fluid to inhibit gas hydrate agglomeration, wherein the process liquid hydrocarbon comprises a recycled and conditioned produced hydrocarbon, wherein the recycled and conditioned produced hydrocarbon is conditioned by cooling the produced hydrocarbon to 3° C. or below thereby removing components forming a solid at about 3° C.

2. The method of claim 1 wherein the produced fluid is produced from a subsea reservoir.

3. The method of claim 2 wherein the produced hydrocarbon comprises a hydrocarbon gas, a hydrocarbon liquid, or a combination thereof.

4. The method of claim 2 wherein the produced hydrocarbon comprises a low-boiling, $C_1$-$C_5$ hydrocarbon gas.

5. The method of claim 1 wherein the process liquid hydrocarbon further comprises a refined hydrocarbon.

6. The method of claim 5 wherein the refined hydrocarbon comprises fuel oil, diesel, kerosene, gasoline, or a combination thereof.

7. The method of claim 6 wherein the refined hydrocarbon comprises diesel.

8. The method of claim 1 wherein the recycled and conditioned produced hydrocarbon is produced from a subsea reservoir, conditioned, and recycled to the produced fluid.

9. The method of claim 1 wherein an effective amount of the anti-agglomerant compound is from about 0.1 vol % to about 10 vol % based on the volume of produced water in the produced fluid.

10. The method of claim 9 wherein the effective amount of the anti-agglomerant compound is from about 0.1 vol % to about 5 vol %.

11. The method of claim 10 wherein the effective amount of the anti-agglomerant compound is from about 0.1 vol % to about 3 vol %.

12. The method of claim 1 wherein the produced fluid comprises at least about 55% by volume water.

13. The method of claim 12 wherein the produced fluid comprises at least about 60% by volume water.

14. The method of claim 12 wherein the produced fluid comprises at least about 70% by volume water.

15. The method of claim 1 wherein the recycled and conditioned produced hydrocarbon is added to the produced fluid in an amount to provide a water cut of 70% or less.

16. The method of claim 1 wherein the recycled and conditioned produced hydrocarbon is added to the produced fluid in an amount to provide a water cut of 60% or less.

17. The method of claim 1 wherein the recycled and conditioned produced hydrocarbon is added to the produced fluid in an amount to provide a water cut of 50% or less.

18. The method of claim 12 wherein the produced fluid comprises at least about 65% by volume water.

* * * * *